United States Patent [19]

Maeda et al.

[11] Patent Number: 4,531,164
[45] Date of Patent: Jul. 23, 1985

[54] CAMERA AND SEPARABLE VIDEO RECORDER/REPRODUCER ARRANGEMENT

[75] Inventors: Masaya Maeda; Hiroyuki Takimoto; Susumu Kozuki, all of Kanagawa, Japan

[73] Assignee: Canon Kabushiki Kaisha, Japan

[21] Appl. No.: 351,605

[22] Filed: Feb. 23, 1982

[30] Foreign Application Priority Data

| Feb. 26, 1981 | [JP] | Japan | 56-27140 |
| Mar. 6, 1981 | [JP] | Japan | 56-32106 |
| Mar. 6, 1981 | [JP] | Japan | 56-32107 |
| Jun. 24, 1981 | [JP] | Japan | 56-97913 |

[51] Int. Cl.³ .................. H04N 5/782; G11B 31/00; G11B 1/04; G11B 15/02
[52] U.S. Cl. .................. 360/33.1; 358/906
[58] Field of Search .................. 360/33.1, 35.1; 358/310, 906

[56]   References Cited
U.S. PATENT DOCUMENTS

| 4,386,376 | 5/1983 | Takimoto et al. | 358/906 |
| 4,400,743 | 8/1983 | Takimoto et al. | 358/906 |
| 4,447,837 | 5/1984 | Hirata et al. | 360/33.1 |

FOREIGN PATENT DOCUMENTS 56-4992  1/1981  Japan .................. 358/906

Primary Examiner—Donald McElheny, Jr.
Attorney, Agent, or Firm—Toren, McGeady, Stanger, Goldberg & Kiel

[57]   ABSTRACT

A video system comprising a video camera and a recording device to record video signals obtained by the video camera. The recording device includes a video tape recorder (VTR) which may be combined with the video camera when recording and otherwise may be combined with a reproduction unit. Mode switches in the VTR are changed over depending on the combination desired. When the VTR is used with the camera, the combination records sound, video signal and controls signals on a tape wound around a drum. A system control circuit controls various motors and solenoids control operation of the VTR. Power supply to the system is controlled by a power source switch in the VTR, which element provides "OFF", "STANDBY I" and "STANDBY II" modes. Delay elements operate in the two standby modes. When the power source switch is in either standby mode, loading is done automatically. One standby mode provides power to a rotating system and the other mode provides no power. The delay elements provide different delay times for each mode so that triggering of the camera can be made with due consideration for the start up time of the rotating system. The built-in delays are effective in conserving power.

1 Claim, 10 Drawing Figures

FIG.7

| | 36 | 38 | 39 | Pt.d | Pt.e | Tr1 | Tr2 | Tr3 | Tr4 | Tr5 | Tr6 | 37 |
|---|---|---|---|---|---|---|---|---|---|---|---|---|
| 1 | a | OFF | OFF | H | L | ON | OFF | OFF | ON | ON | OFF | REVERSE |
| 2 | a | OFF | ON | L | L | OFF | OFF | OFF | OFF | OFF | OFF | 0 |
| 3 | a | ON | OFF | H | L | ON | OFF | OFF | ON | ON | OFF | REVERSE |
| 4 | a | ON | ON | L | L | OFF | OFF | OFF | OFF | OFF | OFF | 0 |
| 5 | b,c | OFF | OFF | L | H | OFF | ON | ON | OFF | OFF | ON | NORMAL |
| 6 | b,c | OFF | ON | L | H | OFF | ON | ON | OFF | OFF | ON | NORMAL |
| 7 | b,c | ON | OFF | L | L | OFF | OFF | OFF | OFF | OFF | OFF | 0 |
| 8 | b,c | ON | ON | L | L | OFF | OFF | OFF | OFF | OFF | OFF | 0 |

CAMERA AND SEPARABLE VIDEO RECORDER/REPRODUCER ARRANGEMENT

BACKGROUND OF THE INVENTION

1. Field of the Invention

The present invention relates to a video system, particularly to a video system which uses a small size cassette for reducing the size and the weight of a video tape recorder and is chiefly intended for use during photography.

2. Description of Prior Arts

A conventional type of video system is shown in FIG. 1. In this drawing, what is shown as element 1 is a video camera, and element 2 is a VTR, while element 3 is a cable. An image photographed by the video camera 1 is converted into an NTSC signal by the camera, which signal then is sent through the cable 3 to the VTR 2. The VTR 2 converts the NTSC signal, at the time of reproduction, into a signal which can be reproduced by a television set by a built in RF conversion system.

This type of VTR used in a portable video system has the function of recording images on a magnetic tape within a magnetic tape cassette and reproducing the image from said tape. NTSC signals from a video camera and NTSC signals from a television broadcasting station are used as an image recording signal. Also, output signals reproduced in this type of video system are VHF signals obtained by a frequency modulation of the NTSC signals to the VHF band, so that they can be reproduced at a home use TV set having no video input terminal using one of the channels of said TV set. Since a VTR having such reproduction function contains a servo-system for reproduction, a power source, a device to convert reproducing signals to NTSC signals, and an RF conversion system to make a frequency modulation for the NTSC signals, problems such as inconvenience in portability and maneuverability with respect to size and the weight, etc. of a VTR itself are unavoidable.

Also, in a conventional video tape recorder, a system has been known such that, after a power source switch is thrown before a recording is started, a recording button or a reproduction button is pressed to take out a tape from a cassette and the tape is wound around a cylindrical tape guide having a rotating head being built in the same (hereinafter called loading), then said loading is stopped by an output of a loading completion detecting switch. Also, when a stop button is pressed upon completion of a recording, the above-mentioned recording or reproduction button is reset. At this time, the separating of the tape from the cylindrical tape guide and housing the same in the cassette (hereinafter called unloading) is carried out. This function is carried out only when an unloading completion detecting switch has not detected an unloading completion and the stop button is pressed.

However, when such complicated arrangement is employed, not only does the mechanism within a video tape recorder become complicated but there will also be many elements not necessary for operating the system, which is detrimental to reducing the size and weight of the system.

SUMMARY OF THE INVENTION

The present invention, therefore, is made in view of the above-mentioned shortcomings of the conventional arrangement for providing a video system.

In particular, it is an object of the present invention to provide a video system comprising a VTR having a recording function on a recording medium and a video camera having a photographing function, and it is also intended to reduce the size and weight of the total system and to improve its handling characteristic.

It is, further, another object of the present invention to provide a video system in which a reproduction unit for making a reproduction from a VTR is added to the VTR and the video camera.

Still other objects than what is mentioned above of the present invention will be made clear by the following detailed explanation of the present invention together with the drawings attached hereto.

BRIEF DESCRIPTION OF THE DRAWINGS

FIG. 7 is a truth table to show the operating state of the motor shown in FIGS. 6(a) and 6(b).

DETAILED DESCRIPTION OF THE PREFERRED EMBODIMENTS

Figure 1:
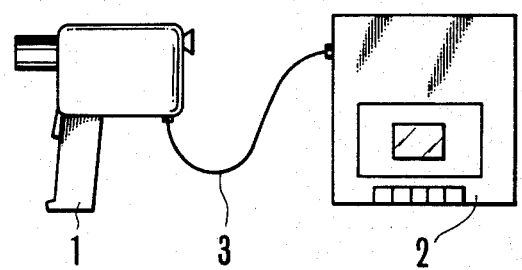
FIG. 1 is a front elevation to show a conventional video system.
Figure 2A:
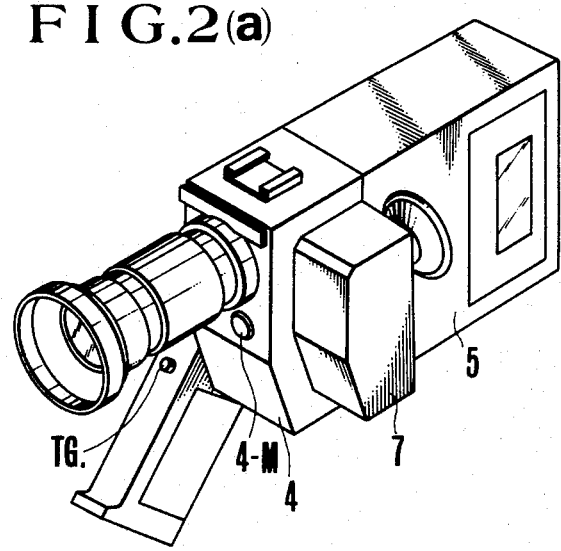
FIGS. 2(a) and (b) are drawings to show an example of the present invention.

FIGS. 2(a) and (b) show an example of the present invention, a video system chiefly comprising a video camera 4, a VTR 5, a reproduction unit 6. The VTR 5 is so made to have mainly a recording function and a reproduction mechanism; a power source circuit (AC power source) and a system control mechanism, etc. are housed within a reproduction unit 6.

FIG. 2(a) is an oblique view showing the VTR 5 and the camera 4 in a combined state, wherein 4-M is a microphone, 7 shows an electronic view finder, while TG represents a trigger switch to instruct the starting of a photographing.

Figure 2B:
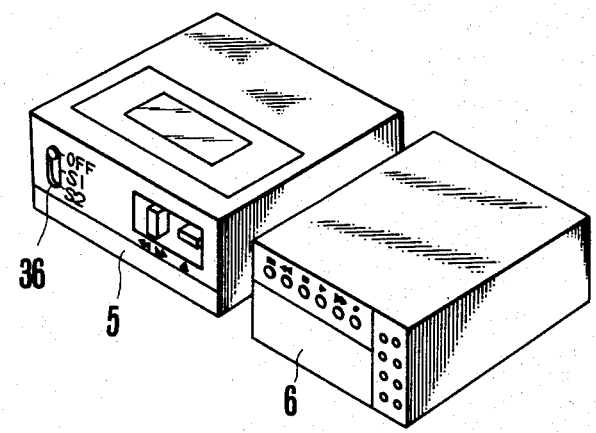

FIG. 2(b) shows the VTR 5 and the reproduction unit 6 as being combined at the time of reproduction, wherein the VTR 5 and the reproduction unit 6 may be combined either by a cable connection or by a mechanical connection with a connector such as a hot shoe, etc.

Figure 3:
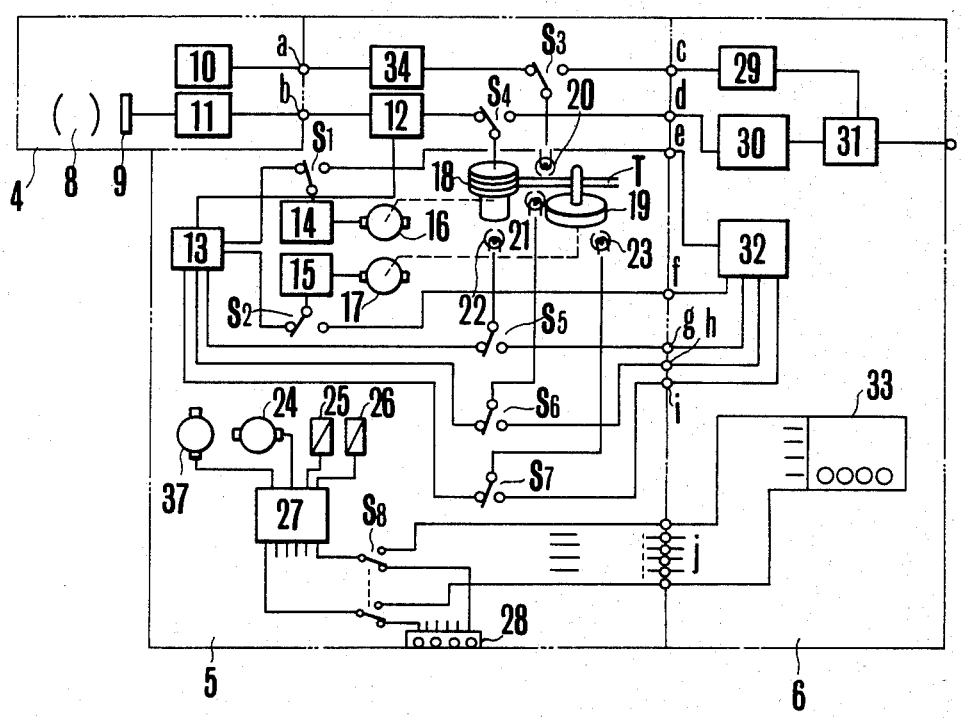
FIG. 3 is a circuit showing the circuit arrangement in each of units shown in FIG. 2.

FIG. 3 shows a block diagram for a circuit in each of the units of the present invention. Video signals are produced by an optic 8, an image pickup element 9 and a camera signal processing circuit 11 within the video camera 4 and are output to a terminal b. Sound signals obtained by the microphone 4-M of FIG. 2(a) are output to a terminal a through a pre-amplifier 10. The sound signals and the video signals thus obtained go through a sound recording amplifier 34 and a video signal recording circuit 12 respectively and are recorded on a magnetic tape T by a sound head 20 and a rotating magnetic head or heads (not being shown in the drawing) provided on a cylindrical tape guide 18 (hereinafter called as a drum). At this time, a recording servo circuit 13 controls the rotation of a drum motor 16 in phase synchronism with synchronizing signals of recording video signals to control a capstan motor 17 for causing the same to run with a constant speed. The above-mentioned rotating magnetic head consecutively records video signals on slant track on the tape T being wound obliquely around the drum 18. The sound head records sound signals at an edge of the tape T in a traverse direction thereof. At the same time, control signals (hereinafter called as CTL) corresponding to a frame frequency of the video signals are recorded at the other edge of the tape T, thus forming a control track.

Figure 4:
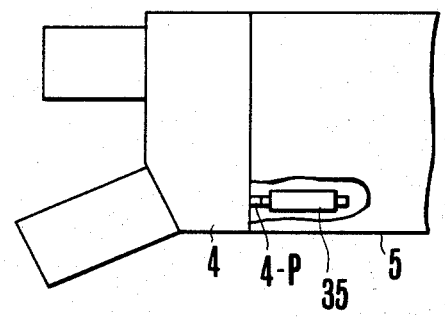
FIG. 4 is a partially broken sketch of the video system shown in FIG. 3 to explain a change over of switches S1 to S8 in FIG. 3.

Detection heads 22 and 23 are provided to detect a number of rotations and a rotating phase of the rotating head and a capstan roller 19, respectively. Outputs of the detection heads 22 and 23 are fed back to the recording servo circuit 13 through switches S5 and S7. What are shown as 14, 15 are driving circuits respectively for the drum motor 16 and the capstan motor 17, wherein servo error signals, etc. are supplied from the recording servo circuit 13 at a time of recording. What is shown as 27 is a system control circuit, that is a circuit block to control a reel motor 24, a loading motor 37, a pinch roller solenoid 25, a shut off solenoid 26, etc. in correspondence with an operation of an operating part 28 of the VTR, for recording, fast forwarding, quick return, and to set a mode for loading and unloading which are conventionally known in a VTR and an audio tape recorder. Since the camera 4 and the VTR 5 are combined at a time of recording, recording-reproducing mode change over switches S1, S2, S3 . . . S8 are to be changed over to a side shown by solid lines in FIG. 3. That is, in FIG. 4, a change over switch 35 is so made that the mode change over switches S1 to S8 are housed within the switch 35 and are to be changed over as mentioned above when being pressed by a projection 4-P provided at the camera. A recording-reproducing mode change over which requires change overs of a number of circuits can be done easily and surely by said arrangement and at the same time, a recording mode can be set by connecting the camera to the VTR, thus there will be no failures in the change over.

Also these change over switches S1 to S8 are changed over from their put in positions to the other side in FIG. 3 as the camera 4 is separated from the VTR 5 and the VTR 5 is combined with the reproduction unit 6. At the same time, the VTR 5 and the reproduction unit 6 are combined, their circuits are connected through connection terminals c to j.

What is shown as element 29 at the reproduction unit 6 is a sound reproduction circuit, and element 30 is a video signal reproduction circuit, while element 31 is an RF converter, and element 32 is a reproduction servo circuit, while element 33 is a system control part.

Next, explanations will be made regarding the function and operation of the VTR 5 at, the time of photographing referring to FIG. 6(a).

Figure 6A:
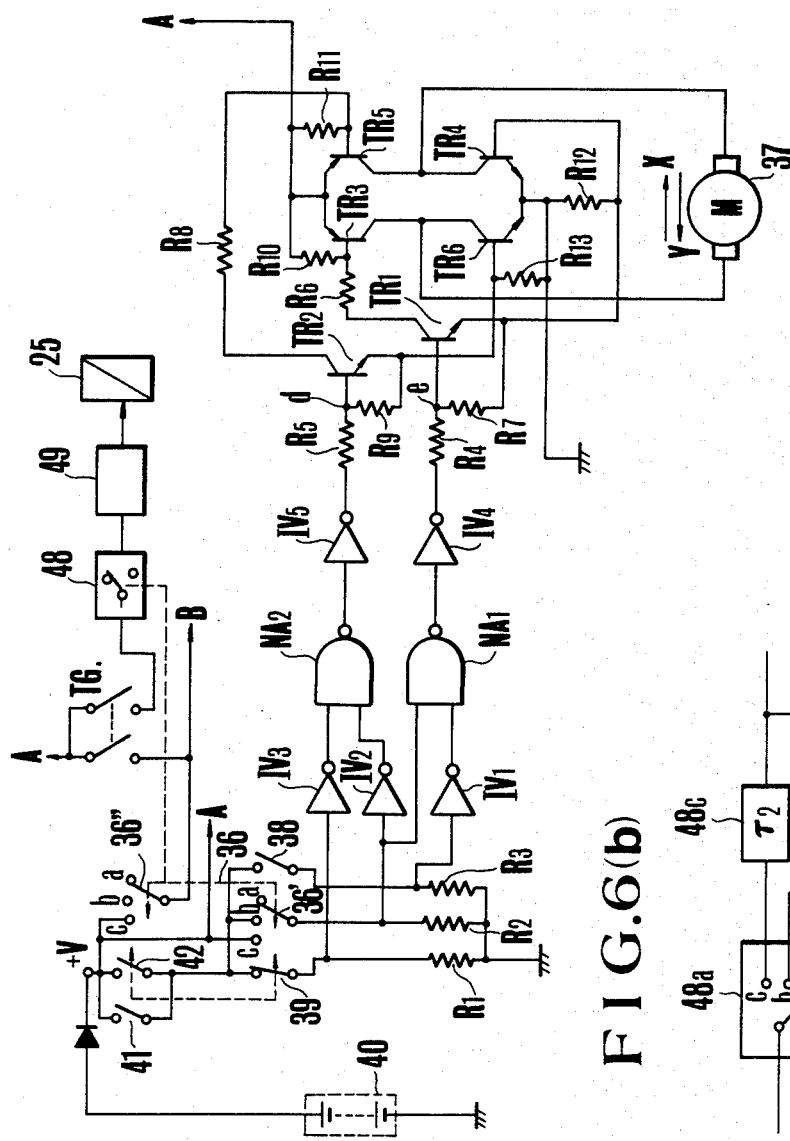
FIGS. 6(a) and 6(b) show control circuit diagrams of a loading motor.

FIG. 6(a) is a circuit connection diagram to show an arrangement of a loading motor control circuit within the system control part 27 of FIG. 3. What is shown as element 38 is a switch to be closed when a tape loading is completed, and 39 is a switch to be closed when a tape unloading is completed, while 42 is associated with the switch 39 and is opened when the switch 39 is closed. Also, 36 is a power source switch provided at the VTR 5 as shown in FIG. 2 and is operated from outside, having three positions, OFF, a stand-by 1 and a stand-by 2. This power source switch 36 comprises associated switches 36' and 36" being so made as consecutively changed over to contacts a, b and c. When the power source 36 is at the OFF position, the switches 36', 36" are connected to the contact a, and when a cassette is loaded into the VTR 5 and the power source switch 36 is set at the stand-by 1, the associating switches 36', 36" are respectively connected to the contact b, while they are connected to the contact c as the power source switch 36 is set at the stand-by 2. What is shown as 41 is a switch which is opened only when the switch 36 is contacting the contact a that is at its OFF position, and is closed at any other time.

The above-mentioned three switches 36, 38 and 39, being connected in parallel will be grounded through resistors R1, R2 and R3 at their one end when they are connected to + side of a power source at the other ends, so that high level signals (hereinafter called as "H") can be obtained with the switches ON and low level signals (hereinafter called as "L") can be obtained with the switches OFF at their respecting connecting points with the resistors R1, R2 and R3.

What are shown as IV1, IV2 and IV3 are inverters to invert signals obtained corresponding to ON, OFF of switches 38, 36 and 39 respectively, and NA1 is a NAND gate to receive an output of the inverter IV1 and a signal obtained at a connecting point between the power source switch 36 and the resistor R2. And NA2 is a NAND gate to receive outputs of the inverters IV2 and IV3, and what are shown as IV4 and IV5 are inverters to invert outputs of the NAND gates NA1 and NA2 respectively. Outputs of said inverters IV4 and IV5 will be added to respective bases of npn switching transistors TR1 and TR2 through resistors R4 and R5.

Here, the collector side of the transistor TR1 is connected to the base of pnp switching transistor TR3 through a resistor 6 and its emitter side is connected to the base of an npn switching transistor TR4 placed at a diagonal position against the transistor TR3 and at the same time is connected to its own base through a resistor R7.

On the other hand, the collector side of the transistor TR2 is connected to the base of pnp switching transistor TR5 through a resistor R8, also its emitter side is connected to a base of an npn switching transistor TR6 placed at a diagonal position against the transistor TR5, and at the same time is connected to its own base through a resistor R9. Also, emitter sides and bases of the transistors TR3 and TR5 are connected to a power source path A (the bases being through resistors R10 and R11 respectively), and emitter sides and bases of the transistors TR4 and TR6 are grounded (the bases being through resistors R12 and R13, respectively). The above-mentioned loading motor 37 is insertedly connected between a collector connection point of the transistors TR5 and TR4 and a collector connecting point of the transistors TR3 and TR6.

Figure 5A:
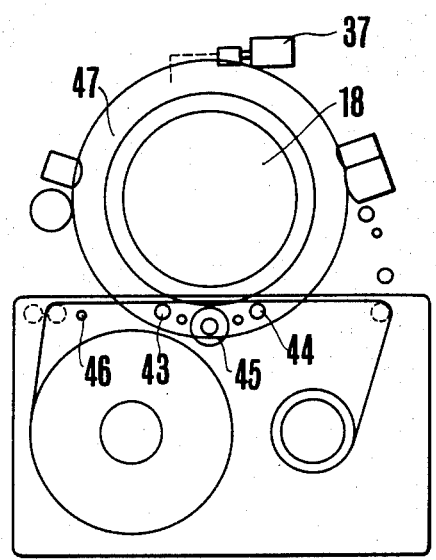
FIGS. 5(a) and (b) are drawings to show an unloading state and a loading state of a tape.
Figure 5B:
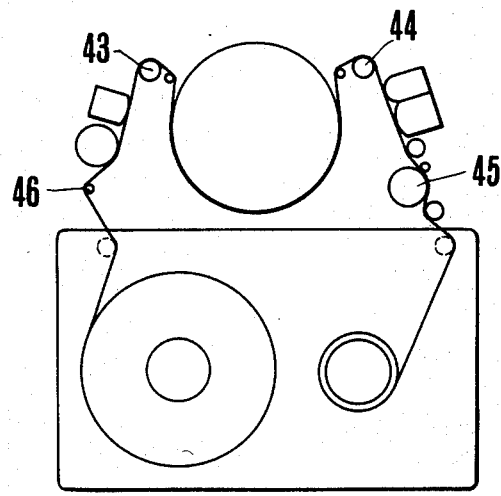

In such an arrangement, when the power source switch 36 is made ON by a stand-by operation under a tape unloading completion state, an output of the NAND gate NA1 becomes "L", while an output of the NAND gate NA2 is left in "H", that is, an output of the inverter IV5 is left in "L". Therefore an output of the inverter IV4 becomes "H", and the transistor TR1 has power supplied thereto by this, then the transistors TR3 and TR4 also have power supplied thereto. Therefore, power flows to the loading motor 37 in the direction of an arrow X, and the motor 37 makes a normal rotation, thus a taking out of the tape will be done. That is, pull out pins 43, 44 and 46 and a pinch roller 45 positioned within the tape cassette as shown in FIG. 5(a) are shifted in association with a loading ring 47 being driven by the loading motor 37. A state at which said shifting has been completed is shown in FIG. 5(b). The loading completion switch will be closed at the state shown in FIG. 5(b).

And since the tape loading completion detecting switch 38 becomes ON, as mentioned above, at the loading completion position, an output of the NAND gate NA1 becomes "H" by this. Therefore, an output of the inverter IV4 becomes "L" and the transistor TR1 is placed in a non-conductive state, then the transistors TR3 and TR4 are both placed in a non-conductive state. Thus the motor 37 is stopped. As mentioned above, a loading action is carried out only by placing the power source switch at the VTR side to ON, not depending on an instruction from the camera side. Thus a photographer can concentrate his attention to photographing.

On the other hand, as the power source switch 36 is made OFF under the tape loading state when photographing is completed, the switch 41 is opened in association therewith. Since the tape unloading completion detecting switch 39 is placed in OFF state at this time, an output of the NAND gate NA2 becomes "L" while an output of the NAND gate NA1 is, left in "H", that is an output of the inverter IV4 is left in "L". Therefore, an output of the inverter IV5 becomes "H" and power is supplied to the transistor TR2 thereby, thus power is supplied to the transistors TR5 and TR6 and current flows to the loading motor 37 in the direction of an arrow Y causing the motor 37 to make a reverse rotation. And, when the tape unloading completion detecting switch 39 becomes ON at the tape unloading completion position, an output of the NAND gate NA2 becomes "H" by this. Therefore, an output of the inverter IV5 becomes "L", thus the transistor TR2 is placed in a non-conductive state. Therefore, the transistors TR5 and TR6 are placed in a non-conductive state and the motor 37 is stopped. Thus, loading will be done by a normal rotation of the motor 37 and an unloading into the cassette will be done by a reverse rotation of the same.

As has been mentioned above, as the power source switch is returned to OFF position, the switch 36 is opened (i.e. being ON at the contact a) and the switch 41 is opened in association therewith. Further, the loading motor makes reverse rotation until the unloading switch 39 is closed and the switch 39 is closed upon completion of loading, then the switch 42 is opened in association with the switch 39, placing the power source in a completely OFF state.

The state of the switches 36, 38, 39 and an ON-OFF relationship of the transistors TR1 to TR6 are shown in FIG. 7.

At this time, under a stand-by 1 state, power is not supplied to a power source path B which supplies power to other circuits such as a processing system and a servo system, etc. And, when the camera trigger switch TG, which directs the starting of recording, is operated, power is supplied to said circuit systems from the power source path A through the power source path B. After the trigger switch TG is made ON, a power supply to a driving circuit 49 of the pinch roller pressing solenoid 25 which presses the pinch roller against the capstan 19 is delayed by a time interval τ1 by a delay circuit 48. By this arrangement, an electrical and mechanical delay of the drum motor 16 and the capstan 17 are provided. Further, a start of a recording after the trigger switch TG is made ON, that is, after a release, is somewhat delayed, but power consumption can be reduced. That is, it is effective in the mode of the stand-by 1 when a non-photographing interval is comparatively long.

In the mode of the stand-by 2, since the switch 36" is connected to the contact c, the drum motor 16 and the capstan motor 17 are always rotating in said mode. And, since a delay time of the delay circuit 48 is set at τ2 which is shorter than the interval τ1, the pinch roller pressing solenoid 25 works immediately after the trigger switch TG is made ON, and recording is started. Thus, the stand-by 2 mode is effective for photographing a scene in which timing of photographing is an important factor.

Figure 6B:
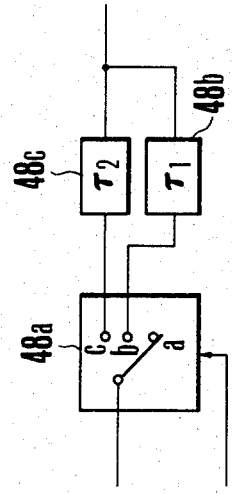

Details of the delay circuit 48 are shown in FIG. 6(b). In FIG. 6(b), element 48a is an analog switch which is connected to a contact a when the switch 36 is at the OFF position and is connected to a contact b when the switch 36 is at the stand-by mode 1, then is connected to a contact c at the time of the stand-by 2 mode. What is shown as element 48b is a delay circuit with the delay time τ1 and 48c is a delay circuit with the delay time τ2. As mentioned above, delay times are selected depending on the stand-by 1 mode and the stand-by 2 mode so that a selection of a stand-by mode suitable for a photographing object can be made.

Next, explanations will be made concerning operation at the time of reproduction.

At the time of reproduction, the camera is separated from the VTR and the reproduction unit 6 is combined. When said latter combination is made, the system control block 27 is controlled by an operating part 33 of the reproduction unit 6 electrically or mechanically. Therefore all operating functions will be placed at the reproduction unit side. Thus, a user can concentrate his attention to the reproduction unit without any hesitation.

Further, as the camera 4 is separated from the VTR, the recording-reproducing mode setting switches S1 to S7 are changed over to the other side of what is shown in FIG. 3 for recording. Therefore, video signals and sound signals recorded in the tape go through the switches S4, S3, respectively and through the video signal reproduction circuit 30 and the sound reproduction circuit 29 and are converted to RF signals in VHF band by the RF converter 31, and are reproduced in a TV set. Also the reproduction servo circuit 32 is provided at the reproduction unit side and obtains TACH pulses, reproduction CTL signals and capstan FG output etc. obtained from the switches S5, S6, S7, thus making a reproduction tracking servo operation.

As has been explained above in detail, an arrangement wherein loading is done automatically by removing the power source switch from its OFF position is employed in the present invention, thus its handling characteristic is improved and structure thereof is simplified.

Also, when the above-mentioned power source switch is placed in other positions than OFF position, a mode to make power supply to a rotating system and a mode not to make the same are available and delay circuits having different delay times are respectively provided for each mode, thus a trigger can be made with due consideration being made for a start up time of the rotating system.

Also, an arrangement is provided wherein a detection means to detect an unloading completion is provided and, as the power source is made OFF, an unloading completion signal can be obtained from said detection means so that an unloading is automatically made, and, thus, its handling and operation can be done very easily.

Further, an arrangement is provided wherein power supply to circuits related to loading is maintained even if the power source is made OFF until said unloading is completed, and the power supply is automatically stopped by completion of unloading, therefore the handling characteristic is further improved and power saving can be made without any particular efforts.

Also, in a video system of the present invention, a VTR which is combined to a video camera for making a photographing is constructed of parts containing a recording mode only, therefore a camera and a VTR is integrally made and thus a reduction in size and weight can be achieved.

Further, since a VTR is made to have as small size as possible for having the minimum function needed solely for a recording, when the VTR is combined with a video camera, the burden on the user at the time of photographing can be reduced to the minimum, thus a handling characteristic is further improved and it will be easy to carry the same around.

Further, when the camera is removed from the VTR, the VTR is automatically changed over to a reproduction mode and it is combined with a reproduction unit so that a function in a reproduction mode can be obtained without delay, thus it is a very convenient device as a simple video system.

Also, a VTR in the present invention can naturally be combined with other video sources (for example, a tuner for television signal, etc.) for making a video recording without using a video camera. That is if the same projection as that provided at the video camera is provided at a unit to connect other video sources to the VTR of the present invention, said projection can be attached to an input of the VTR for automatically changing over the VTR to a recording mode.

While explanations of the present invention have been made above, taking a video camera and a VTR as an example, the invention can be applied to a disk type recording apparatus to make recording on a disk shape material, etc.

Also, various other applications and modifications are possible for the present invention within the scope of the claims attached hereto.

What is claimed is:

1. A video recording system using a video recording tape, comprising in combination:
   (a) image pick-up means for receiving an object image and for producing a video signal in response thereto;
   (b) recording means for recording the video signal on the video recording tape;
   (c) loading means for loading said recording means with the video recording tape;
   (d) tape advancing means for advancing the video recording tape relative to said recording means, said advancing means including a capstan driven by a motor and a pinch roller movable for engaging the tape with said capstan to advance the tape;
   (e) actuation means responsive to an actuation signal for actuating said pinch roller so that the pinch roller engages the tape with said capstan;
   (f) a first switch for causing said loading means to load said recording means with the tape;
   (g) a second switch for producing a recording start instruction;
   (h) signal generation means responsive to said recording start instruction for generating said actuation signal, said signal generation means including a delay circuit having a plurality of predetermined different time delays for generating the actuation signal with predetermined different time delays selectively in response to the recording start instruction; and
   (i) selection means for selecting one of the time delays of said delay circuit.

* * * * *

UNITED STATES PATENT AND TRADEMARK OFFICE
CERTIFICATE OF CORRECTION

PATENT NO. : 4,531,164
DATED : July 23, 1985
INVENTOR(S) : Masaya Maeda, et al

It is certified that error appears in the above-identified patent and that said Letters Patent is hereby corrected as shown below:

In the heading of the patent it should read:

-- [54] VIDEO CAMERA AND SEPARABLE VIDEO

RECORDER/REPRODUCER ARRANGEMENT --

Signed and Sealed this

Twenty-seventh Day of May 1986

[SEAL]

Attest:

DONALD J. QUIGG

Attesting Officer     Commissioner of Patents and Trademarks